Sept. 29, 1964    E. B. SHULTZ, JR., ETAL    3,150,657
HEATING FURNACE
Filed April 8, 1963

Inventors:
Eugene B. Shultz Jr.
Henry R. Linden
By
Attys.

3,150,657
HEATING FURNACE
Eugene B. Shultz, Jr., Alton, and Henry R. Linden, Hinsdale, Ill., assignors to Institute of Gas Technology, a corporation of Illinois
Filed Apr. 8, 1963, Ser. No. 271,204
9 Claims. (Cl. 126—110)

This invention relates to heating furnaces and more particularly to a self-powered heating furnace of the warm air or warm water type in which the heat transfer medium is positively circulated through the furnace and to the space to be heated.

The provision of heating furnaces which are entirely self-powered is highly desirable for use in locations in which electric power is not readily available or even when power is available to enable continued operation of the furnace in the event of a power failure. It has heretofore been proposed to employ thermocouples to supply the power necessary to operate gas valves in gas furnaces, but thermocouple units cannot furnish sufficient power efficiently to operate circulating fans or pumps required for warm air or warm water furnaces.

The use of fuel cells heated to operating temperature by the furnace suggests itself but presents a number of problems. One of these is the provision of means for maintaining flow of air or other gas as a source of oxygen over the cathode of the fuel cell which would require the provision of a small blower powered from an external source for startup. Furthermore, the most feasible fuel cells for use with heating gas, such as natural gas, use carbonate electrolytes. The use of pure oxygen or air with such cells produces serious polarization effects at the cathode which may be avoided by the presence of $CO_2$ in the oxygen bearing gas. It is also necessary for proper operation of the cells that $CO_2$ and steam both be present in the fuel to prevent decomposition of the electrolyte and carbon formation. Additionally, excess gas from the cell must be disposed of preferably without waste.

It is accordingly an object of the present invention to provide a heating furnace in which fuel cells are used efficiently as a source of power for operating circulating means for the heating medium without requiring any external power for startup or operation.

Another object is to provide a heating furnace in which the fuel cells are mounted in the combustion chamber of the furnace so that the combustion gas flowing over the cathode serves as a source of oxygen and the cells are heated to operating temperature by the hot combustion gases.

A still further object is to provide a heating furnace in which fuel gas is mixed with steam and heated to reform it into a hydrogen rich stream suitable as a fuel for the cell.

The above and other objects and features of the invention will be more readily apparent from the following description when read in connection with the accompanying drawing, in which.

Figure 1:
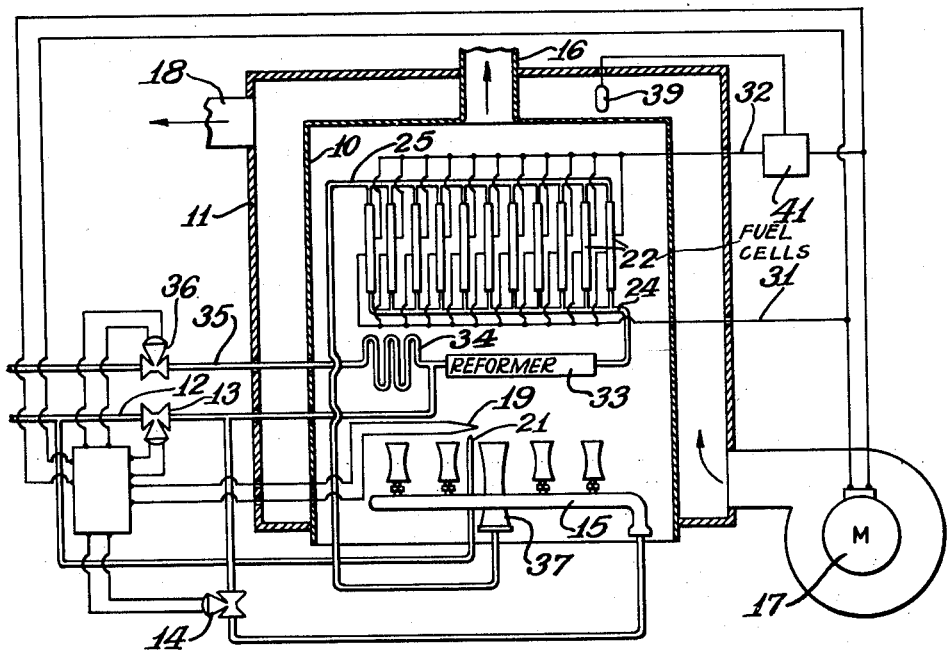
FIG. 1 is a more or less diagrammatic sectional view of a furnace embodying the invention.

The invention is illustrated as applied to a conventional warm air furnace having a combustion chamber 10 in which fuel is burned and which is enclosed by a jacket 11 through which air to be heated is to be circulated. The furnace, as shown, is adapted to burn gas, such as natural gas, which is supplied from a suitable source through a supply conduit 12 past a first solenoid control valve 13 and a second solenoid control valve 14 to one or more main burner units 15. When both valves 13 and 14 are open, gas will be supplied to the main burner units 15 to burn in the furnace chamber 10 with the exhaust gases being carried away through a flue 16 extending through the jacket. Air from the space to be heated is circulated through the jacket by air circulating means, such as a blower 17, with the cool return air being fed into the lower part of the jacket and the warm air being conducted back to the space to be heated through one or more ducts 18.

According to the present invention, the power for operating the control valves and the blower is entirely self-generated so that no external electrical power is required for startup or operation of the furnace. For this purpose, initial power for operating the control valves is supplied by one or more thermocouples 19 positioned in the combustion chamber to be heated by the flame by a pilot burner 21 which is supplied with gas from the supply conduit 12 independently of the valves 13 and 14. Additional power for operating the controls and for driving the blower 17 is supplied by a source of fuel cells 22 positioned in the combustion chamber to be heated by the hot combustion gases when the main burners are turned on.

Figure 2:
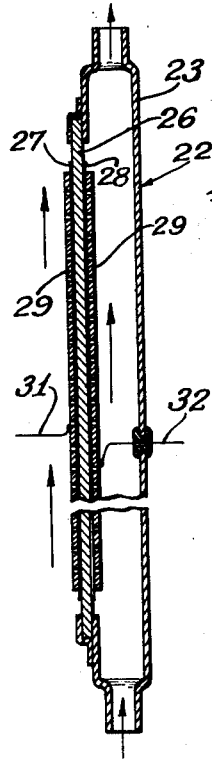
FIG. 2 is an enlarged sectional view of one of the fuel cells.

As shown in FIG. 2, each fuel cell comprises a hollow body 23 closed at one side and open at its other side and provided with openings in its ends for connections to an inlet manifold 24 at the lower end and an exhaust manifold 25 at the upper end. The open side of each casing is closed by a disc or plate 26 which may comprise a solid or semi-solid electrolyte, as more particularly disclosed and claimed in the co-pending application of Shultz et al., Serial No. 177,222, filed March 5, 1962. The electrodes 27 and 28 forming a cathode and anode for the fuel cell overlie the opposite faces of the electrolyte plate and collector grids 29 overlies the electrodes in electrical contact therewith. The collector plates 29 may be connected respectively to leads 31 and 32 through which the several cells are connected in parallel, as seen in FIG. 1. The electrolyte 26 is preferably formed of a carbonate or mixture of carbonates of alkali or alkaline earth metals, as more fully disclosed and claimed in the co-pending application referred to above since this type of electrolyte functions more efficiently with natural gas or other commonly employed fuel gases. A fuel gas is circulated through the casings 23 of the several fuel cells to contact the electrodes 28 thereof. As shown, the fuel gas is prepared by taking natural gas passing through the valve 13 and supplying it to a reformer 33 which comprises a casing containing catalytic material. While the gas is preferably reformed outside of the fuel cells, as shown, it would be possible to combine the reformer and fuel cells and reform the gas in the fuel cells themselves. The reformer is further supplied with steam which is formed in a heating coil 34 positioned in the combustion chamber of the furnace and supplied with water through a conduit 35 under the control of a solenoid valve 36. The steam and fuel cell react in the reformer at elevated temperature to produce a gaseous product containing a high percentage of hydrogen plus excess steam and some carbon dioxide which is formed in the reforming operation. This gas is fed through the fuel cell casing in contact with the anodes 28 and constitutes the fuel supply for operation of the cells. Excess gas passing the cells is conducted from the manifold 25 to an auxiliary burner 37 positioned adjacent to the main burners where the excess fuel from the fuel cells is burned.

The cathode surfaces 27 of the fuel cells are exposed directly to the hot combustion gases passing through the combustion chamber which will normally contain sufficient excess oxygen to supply the necessary oxygen for operation of the fuel cells. This gas will contain sufficient carbon dioxide together with the oxygen to eliminate polarization effects which would occur if pure oxygen or air were used as the oxide contributing gas for the fuel cells. Furthermore, since the natural draft operation of the furnace causes a natural flow of the combustion gas over the cathode surfaces of the fuel cell, no circulating means is required to effect circulation of the gas.

Figure 3:
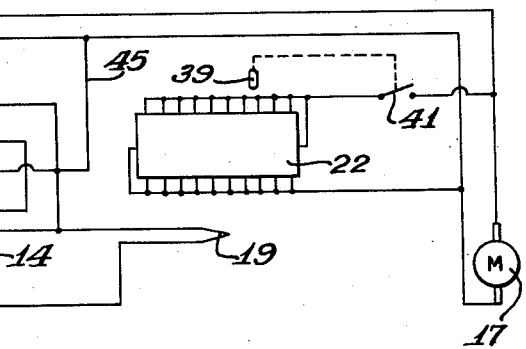
FIG. 3 is a control circuit diagram.

The operation of the furnace may be controlled by a control circuit, as illustrated in FIG. 3. Turning on and off of the main burners is controlled by a conventional room thermostat, as shown at 38, which is normally open until the temperature in the space falls below a predetermined value and then closes. The thermostat is connected in circuit with one side of the thermocouple 19 and connects the three solenoid valves 13, 14 and 36 in parallel with the thermocouple when it closes. The solenoid valve 14 is connected directly in circuit with the thermocouple and thermostat switch 38 while the solenoid valves 13 and 36 are connected through a two-position switch 43 in its normal position, as shown. Thus when the thermostatic switch closes all of the valves 13, 14 and 36 will be opened to supply fuel to the main burners through the valves 13 and 14 and to supply fuel and steam to the reformer through the valves 13 and 36. At this time, the main burners will come on to heat the furnace and simultaneously to heat the reformer and the fuel cells so that the fuel cells will generate an electric voltage.

When the temperature in the furnace jacket or bonnet reaches a predetermined value, as sensed by a bulb 39, the bulb will close a switch 41 in the circuit between the fuel cells and the blower motor 17 to supply power to the blower. At the same time, the fuel cells will supply energizing power to a relay coil 42 to move the switch 43 from its normally closed contact to a lower contact 44 which is connected to one of the leads from the fuel cells. The other lead from the fuel cells is connected through a wire 45 to the other sides of the solenoid valves 13 and 36 so that these valves will be energized by the fuel cells to maintain a supply of fuel and steam to the reformer. When the switch 43 moves away from its normally closed contact it isolates the solenoid valves 13 and 36 from the thermocouple 19, but the valve 14 remains under the control of the room thermostat and the thermocouple 19.

At this time, the furnace will continue to operate in its normal way until the temperature in the space rises sufficiently to cause the room thermostat 38 to open. When this occurs, the solenoid valve 14 will be de-energized and will close, but the valves 13 and 36 will remain open to supply fuel to the fuel cells so that they will continue to furnish electric power for operation of the blower. When the furnace bonnet temperature falls to the point where the switch 41 is opened, the supply of power from the fuel cells to the blower will be interrupted and the valves 13 and 36 will be de-energized and will close. The furnace will remain in this condition until there is a further demand for heat at which time the cycle will be repeated. It will be apparent, of course, that if the room thermostat 38 should close before the bonnet temperature has fallen to the point to cause the switch 41 to open the furnace will continue to operate without interruption of the blower operation.

While one embodiment of the invention has been shown and described herein, it will be understood that it is illustrative only and not to be taken as a definition of the scope of the invention, reference being had for this purpose to the appended claims.

What is claimed is:

1. A heating furnace comprising a combustion chamber having a flue connection for combustion gas, a gaseous fuel burner in the chamber, a gas supply connection from the burner to a source of gaseous fuel, a first control valve in said connection, a gas reformer in the combustion chamber, a connection from the reformer to said source of gaseous fuel, a connection from the reformer to a source of water vapor, a fuel cell in the combustion chamber, a connection from the reformer to the fuel cell to supply reformed gas thereto, an auxiliary burner in the combustion chamber, a connection from the fuel cell to the auxiliary burner to conduct gas thereto from the fuel cell, means to circulate a heat transfer medium through the furnace in heat exchanging relationship with the combustion chamber, an electric motor connected to the circulating means to drive it, electrical connections from the fuel cell to the motor, and a switch in the electrical connections responsive to the temperature of the heat transfer medium in the furnace.

2. A heating furnace comprising a combustion chamber having a flue connection for combustion gas, a gaseous fuel burner in the chamber, a gas supply connection from the burner to a source of gaseous fuel, a first control valve in said connection, a gas reformer in the combustion chamber, a connection from the reformer to said source of gaseous fuel, a connection from the reformer to a source of water vapor, a fuel cell in the combustion chamber, a connection from the reformer to the fuel cell to supply reformed gas thereto, an auxiliary burner in the combustion chamber, a connection from the fuel cell to the auxiliary burner to conduct gas thereto from the fuel cell, means to circulate a heat transfer medium through the furnace in heat exchanging relationship with the combustion chamber, an electric motor connected to the circulating means to drive it, electrical connections from the fuel cell to the motor, a switch in the electrical connections responsive to the temperature of the heat transfer medium in the furnace, second and third control valves in the second and third named connections respectively, control means responsive to the temperature in a space heated by the heat transfer medium to open all of the control valves when said temperature is below a predetermined value and to close all of the control valves when the temperature is above said predetermined value, and electrical connections from said first named electrical connections controlled by said switch to maintain the second and third control valves open when said switch is closed.

3. The heating furnace of claim 2 in which closing of the switch causes the first control valve to close regardless of the condition of the control means.

4. A heating furnace comprising a combustion chamber having a flue connection for combustion gas and means defining passages in the furnace for flow of a heat transfer medium therethrough in heat exchanging relationship with the combustion chamber, a main fuel burner in the combustion chamber, a fuel cell in the combustion chamber above the main burner, a connection to supply fuel gas to one electrode of the fuel cell, the other electrode of the fuel cell being exposed to combustion products in the combustion chamber, means to circulate a heat transfer medium through said passages, an electric motor connected to the circulating means to drive it, and connections from the fuel cell to the motor to supply electric power thereto.

5. A heating furnace comprising a combustion chamber having a flue connection for combustion gas and means defining passages in the furnace for flow of a heat transfer medium therethrough in heat exchanging relationship with the combustion chamber, a main fuel burner in the combustion chamber, a fuel cell in the combustion chamber above the main burner, a connection to supply fuel gas to one electrode of the fuel cell, the other electrode of the fuel cell being exposed to combustion products in the combustion chamber, means to circulate a heat transfer medium through said passages, an electric motor connected to the circulating means to drive it, connections from the fuel cells to the motor to supply electric power thereto, a valve to control supply of fuel gas to the fuel cell, a switch in said connection to control operation of the motor, and control means responsive to the temperature of heat exchange medium in said passages to control the valve and the switch.

6. The heating furnace of claim 4 including control means responsive to the temperature of a space to be heated by the heat exchange medium to control operation of the main burner and the supply of fuel gas to the fuel cell.

7. The heating furnace of claim 5 including control means responsive to the temperature of a space heated by the heat transfer medium to control operation of the main burner, and a connection from the control means to said valve to control the valve jointly with the first named control means.

8. A heating furnace comprising a combustion chamber having a flue connection for combustion gas and means defining passages in the furnace for flow of a heat transfer medium therethrough in heat exchanging relationship with the combustion chamber, a main fuel burner in the combustion chamber, a fuel cell in the combustion chamber above the main burner, a connection to supply fuel gas to one electrode of the fuel cell, the other electrode of the fuel cell being exposed to combustion products in the combustion chamber, an auxiliary burner adjacent to the main burner connected to the fuel cell to receive fuel gas therefrom, and control devices for the furnace connected to the fuel cell to receive electric power therefrom.

9. The heating furnace of claim 8 in which the control devices include motor driven circulating means to circulate a heat transfer medium through said passages and a valve controlling the supply of fuel gas to the fuel cell.

References Cited in the file of this patent

UNITED STATES PATENTS

| | | |
|---|---|---|
| 411,426 | Dahl | Sept. 24, 1889 |
| 2,980,749 | Broers | Apr. 18, 1961 |
| 3,057,340 | Fritts | Oct. 9, 1962 |